UNITED STATES PATENT OFFICE.

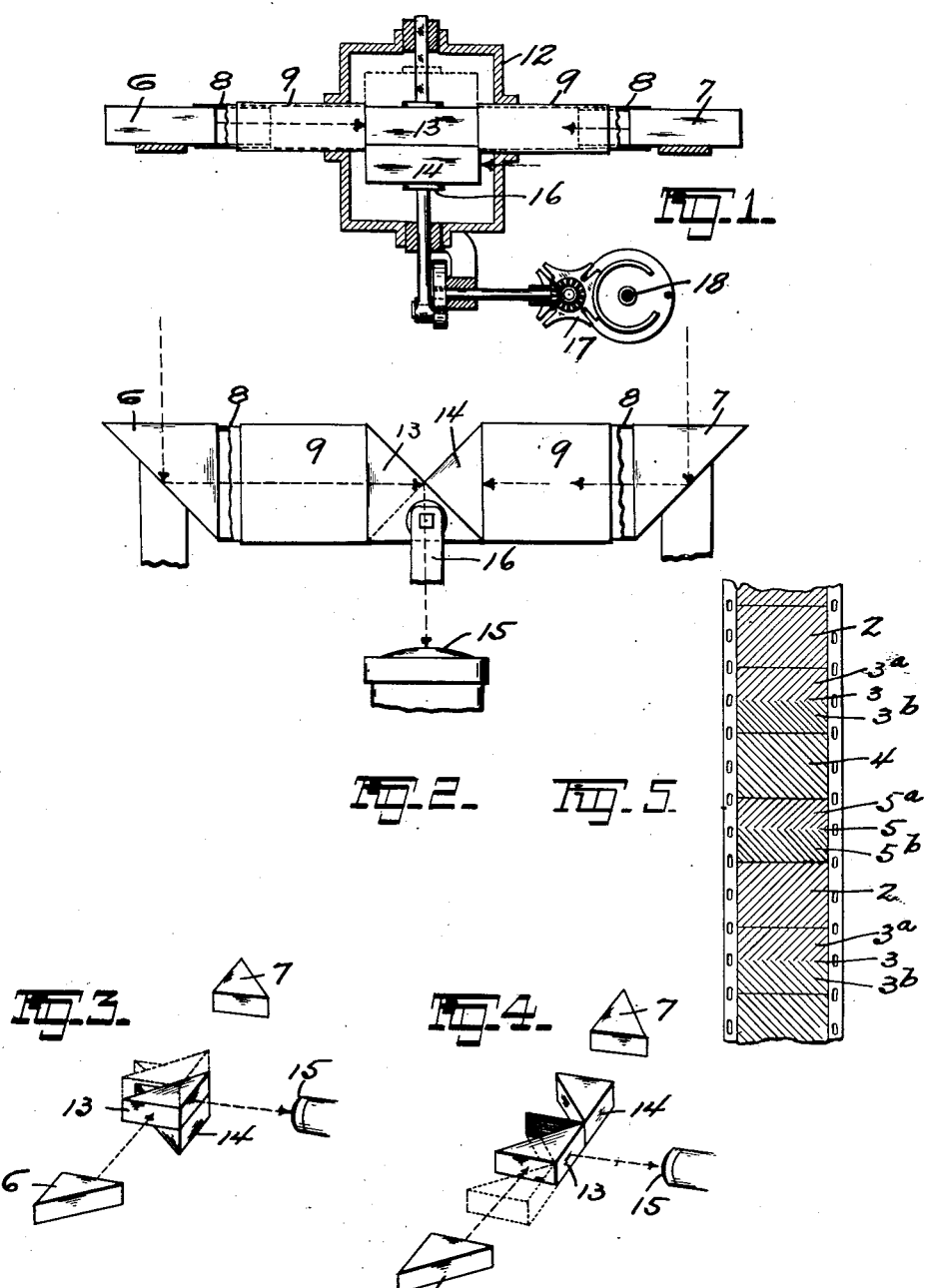

SYDNEY N. BARUCH, OF SAN FRANCISCO, CALIFORNIA.

APPARATUS FOR TAKING PHOTOGRAPHS FOR THE STEREOSCOPIC PROJECTION OF MOTION-PICTURES.

1,307,074.     Specification of Letters Patent.     Patented June 17, 1919.

Application filed August 9, 1918. Serial No. 249,102.

*To all whom it may concern:*

Be it known that I, SYDNEY N. BARUCH, a citizen of the United States, and a resident of the city and county of San Francisco and State of California, have invented a certain new and useful Apparatus for Taking Photographs for the Stereoscopic Projection of Motion-Pictures, of which the following is a specification.

The invention relates to an apparatus for taking successive pictures from different points of view on a film in such manner that when the pictures are projected on a screen by a motion picture projector a stereoscopic effect is produced.

An object of the invention is to produce a stereoscopic motion picture.

Another object of the invention is to produce a stereoscopic motion picture in which the transition from one point of view to the other is gradual and rapid so that perfect stereoscopic motion pictures will be produced.

Another object of the invention is to provide means for varying the distance between the two points of view from which the successive pictures are taken to produce the stereoscopic effect on near and far subjects.

The invention possesses other advantageous features, some of which, with the foregoing, will be set forth at length in the following description, where I shall outline in full, that form of the invention which I have selected for illustration in the drawings accompanying and forming part of the present specification. In said drawings I have shown one specific form of the apparatus of my invention and a modification thereof, but it is to be understood that I do not limit myself to such forms, since the invention, as set forth in the claims, may be embodied in a plurality of forms.

Referring to said drawings:

Figure 1 is an elevation, partly in section, of the apparatus of my invention.

Fig. 2 is a plan view of the apparatus of my invention, part thereof being broken away to disclose the construction.

Fig. 3 is a perspective view showing the relation of the reflecting prisms.

Fig. 4 is a perspective view showing a modified arrangement of the prisms.

Fig. 5 is an elevation of a section of film produced in accordance with my invention.

The apparatus of my invention is attached to and operated in synchronism with a standard motion picture camera, and is constructed to first take one picture from one point of view, then a succeeding picture consisting of two partial views of the same subject taken from two points of view, the two partial views forming the complete picture of the subject, and then a succeeding picture from the second point of view and so on repeatedly. In Fig. 5 I have shown a section of motion picture film made in accordance with my invention. The picture 2 is a full picture of the subject taken from one point of view; the picture 3 consists of two partial views of the same subject, each partial view taken from a different point of view, the upper portion $3^a$ of the picture being taken from the same point of view of the picture 2 and the lower portion $3^b$ being taken from a different point of view. The picture 4 is a full picture of the subject taken from the same point of view as the portion $3^b$. The picture 5 consists of two partial views of the same subject, disposed in the same relation as the partial views in picture 3.

When these pictures are projected on a screen at the speed of motion picture sequence, a stereoscopic picture is produced in which much of the apparent vibration due to the changing point of view is eliminated. Each successive picture varies from the preceding picture by only one half of a picture thereby effecting a gradual although rapid change from one point of view to the other. The projection of these pictures in succession on a screen, produces a stereoscopic effect due to the retentivity of the retina.

The two spaced points of view from which the successive pictures are taken are the two reflecting surfaces 6 and 7, which are preferably prisms. The prisms 6 and 7 are mounted in sleeves 8 which are slidable longitudinally in the barrels 9, so that the spacing of the prisms may be varied. In order to obtain a stereoscopic motion picture of a distant subject, the spacing of the points of view must be greater than for a near subject, and I make the prisms adjustable longitudinally to vary the spacing between them. For the sake of convenience, I shall term the prisms 6 and 7, the objective prisms. These prisms reflect the light rays axially through the barrels 9.

The barrels 9 are mounted on a housing 12, within which is arranged two reflecting surfaces, preferably prisms 13—14, for reflecting the rays passing through the barrels, into the objective lens 15 of the motion picture camera. The prisms 13—14, which I shall term the reflecting prisms, are mounted in a suitable frame 16 and are movable to reflect the beam from either or both of the objective prisms into the objective lens. The prisms 13—14 are preferably superimposed and in close contact as is shown in Figs. 1 and 3, and are moved vertically to change the images reflected into the camera, although they may be arranged side by side and be shifted longitudinally as shown in Fig. 4. The frame carrying the prisms 13—14 is moved in time with the mechanism of the motion picture camera, the movement occurring during that time in which the sensitive film is protected by the shutter. This movement may be accomplished with a Geneva gear 17, the driving shaft 18 of which is connected to a continuously rotating shaft in the camera. The connection between the shaft 18 and the frame carrying the prisms is such that the prisms are moved upward and downward in a step-by-step movement, each step being preferably one-half the total movement of the frame. This will cause the plane of contact of the two prisms to be in the light beams after each alternate movement, and when the prisms are so disposed, the image thrown on the film will consist of two halves, the upper half coming from one objective prism and the lower half coming from the other objective prism.

With the parts in the position shown in Fig. 1, the image reflected by the prism 6 is reflected by the prism 13 into the camera. A rotation of the shaft 18 raises the prisms 13—14 a distance equal to one-half of their total movement bringing the dividing plane of the two prisms into the axis of the barrel. The upper portion of the image from prism 6 is then reflected by the prism 13 into the camera and the lower portion of the image from prism 7 is reflected into the camera. Another rotation of shaft 18 raises the prisms to the top point of their movement and the image from prism 7 only is reflected into the camera. Continued rotation of the shaft produces continued step-by-step reciprocation of the reflecting prisms, producing pictures in the sequence shown in Fig. 5.

I claim:

1. An apparatus for taking photographs for the stereoscopic projection of motion pictures, comprising two adjacent reflecting prisms arranged to reflect images into a motion picture camera, two spaced prisms arranged to reflect images to said reflecting prisms and means for moving said reflecting prisms to reflect images from either and both of said spaced prisms simultaneously into said camera.

2. An apparatus for taking photographs for the stereoscopic projection of motion pictures, comprising two adjacent reflecting prisms arranged to reflect images into a motion picture camera, two spaced prisms arranged to reflect images to said reflecting prisms and means for moving said reflecting prisms to reflect an image from one spaced prism into the camera and then from both spaced prisms into the camera simultaneously.

3. An apparatus for taking photographs for the stereoscopic projection of motion pictures, comprising two superposed contacting reflecting prisms arranged to reflect images into a motion picture camera, each prism being substantially equal in height to the height of the picture area, two spaced prisms arranged to reflect images to said reflecting prisms and means for moving said reflecting prisms vertically in a step-by-step movement, the length of each step being a fraction of the height of one prism.

4. An apparatus for taking photographs for the stereoscopic projection of motion pictures, comprising two superposed contacting reflecting prisms arranged to reflect images into a motion picture camera, each prism being substantially equal in height to the height of the picture area, two spaced prisms arranged to reflect images to said reflecting prisms and means for reciprocating said reflecting prisms vertically in a step-by-step movement, the length of a step being equal to one-half the height of one prism.

5. A motion picture film containing pictures of subjects alternating with pictures consisting of two partial views of the same subject taken from different view points.

In testimony whereof I have hereunto set my hand at San Francisco, California, this 2nd day of August, 1918.

SYDNEY N. BARUCH.

In presence of—

H. G. PROST.